United States Patent [19]

Holka et al.

[11] Patent Number: 5,271,687
[45] Date of Patent: Dec. 21, 1993

[54] SPACE FRAME JOINT CONSTRUCTION

[75] Inventors: Thomas C. Holka, Milford; Sean W. Tant, Dearborn, both of Mich.

[73] Assignee: Ford Motor Company, Dearborn, Mich.

[21] Appl. No.: 862,937

[22] Filed: Apr. 3, 1992

[51] Int. Cl.⁵ .............................................. F16B 7/04
[52] U.S. Cl. .................................. 403/233; 403/235; 403/237; 403/191; 403/403; 52/281; 296/203; 296/205; 296/29
[58] Field of Search ............... 403/237, 235, 234, 233, 403/191, 403, 205, 171, 172, 176; 52/281, 282, 648; 256/65; 296/29, 30, 203-205, 209, 191

[56] References Cited

U.S. PATENT DOCUMENTS

| | | | |
|---|---|---|---|
| 1,707,230 | 4/1929 | Lowy | 285/319 |
| 1,972,309 | 9/1934 | McMurchy | 403/335 |
| 1,988,389 | 1/1935 | Mioton | 403/237 |
| 2,016,702 | 10/1935 | Bauer | 403/237 |
| 2,389,907 | 11/1945 | Helmuth | 296/203 |
| 2,640,443 | 6/1953 | Schieler et al. | 105/404 |
| 2,720,332 | 10/1955 | Holt | 220/4.24 |
| 3,093,219 | 6/1963 | Ramme | 138/117 |
| 3,100,556 | 8/1963 | De Ridder | 52/588 |
| 3,111,205 | 11/1963 | Gresham | 52/588 |
| 3,386,590 | 6/1968 | Gretz | 403/171 X |
| 3,387,418 | 6/1968 | Tyrer | 52/282 X |
| 3,456,966 | 7/1969 | Muller | 403/7 |
| 3,472,301 | 10/1969 | Pearce, Jr. | 411/258 |
| 3,778,175 | 12/1973 | Zimmer | 403/187 |
| 3,845,601 | 11/1974 | Kostecky | 52/290 |
| 3,851,981 | 12/1974 | Corsi et al. | 403/237 |
| 3,867,045 | 2/1975 | Beals | 403/235 X |
| 4,027,855 | 6/1977 | Lauzier | 256/21 |
| 4,163,572 | 8/1979 | Benscoter | 285/121 |
| 4,355,844 | 10/1982 | Muzzarelli | 296/205 |
| 4,390,164 | 6/1983 | Cokelekoglu | 286/65 |
| 4,471,519 | 9/1984 | Capello et al. | 29/460 |
| 4,557,091 | 12/1985 | Auer | 52/282 |
| 4,618,163 | 10/1986 | Hasler et al. | 280/785 |
| 4,652,170 | 3/1987 | Lew | 52/282 X |
| 4,660,345 | 4/1987 | Browning | 52/648 |
| 4,712,942 | 12/1987 | Brown | 403/403 X |
| 4,769,963 | 9/1988 | Meyerson | 52/309.9 |
| 4,912,826 | 4/1990 | Dixon et al. | 29/281.1 |
| 4,976,490 | 12/1990 | Gentle | 296/183 |
| 4,986,597 | 1/1991 | Clausen | 296/203 X |
| 4,988,230 | 1/1991 | Bawthia et al. | 403/403 X |
| 5,052,741 | 10/1991 | Brown et al. | 52/282.1 X |
| 5,062,369 | 11/1991 | Cobden et al. | 296/204 X |
| 5,140,913 | 8/1992 | Takeichi et al. | 296/191 X |

FOREIGN PATENT DOCUMENTS

| | | |
|---|---|---|
| 0061994 | 2/1982 | European Pat. Off. |
| 0271137 | 11/1987 | European Pat. Off. |
| 2701905 | 7/1978 | Fed. Rep. of Germany |
| 2935158 | 3/1980 | Fed. Rep. of Germany |
| 3529662 | 2/1987 | Fed. Rep. of Germany ...... 296/191 |
| 3811427 | 10/1989 | Fed. Rep. of Germany |
| 741735 | 12/1932 | France ................................ 296/203 |
| 1497184 | 8/1967 | France |
| 57-87769 | 6/1982 | Japan |
| 7511612 | 4/1977 | Netherlands ....................... 403/191 |
| WO87/04679 | 8/1987 | PCT Int'l Appl. |

Primary Examiner—Randolph A. Reese
Assistant Examiner—Harry C. Kim
Attorney, Agent, or Firm—Daniel M. Stock; Roger L. May

[57] ABSTRACT

A space frame for an automotive vehicle includes a plurality of structural members and joint constructions for joining the structural members together such that the outer surfaces of the structural members are substantially flush with each other.

15 Claims, 2 Drawing Sheets

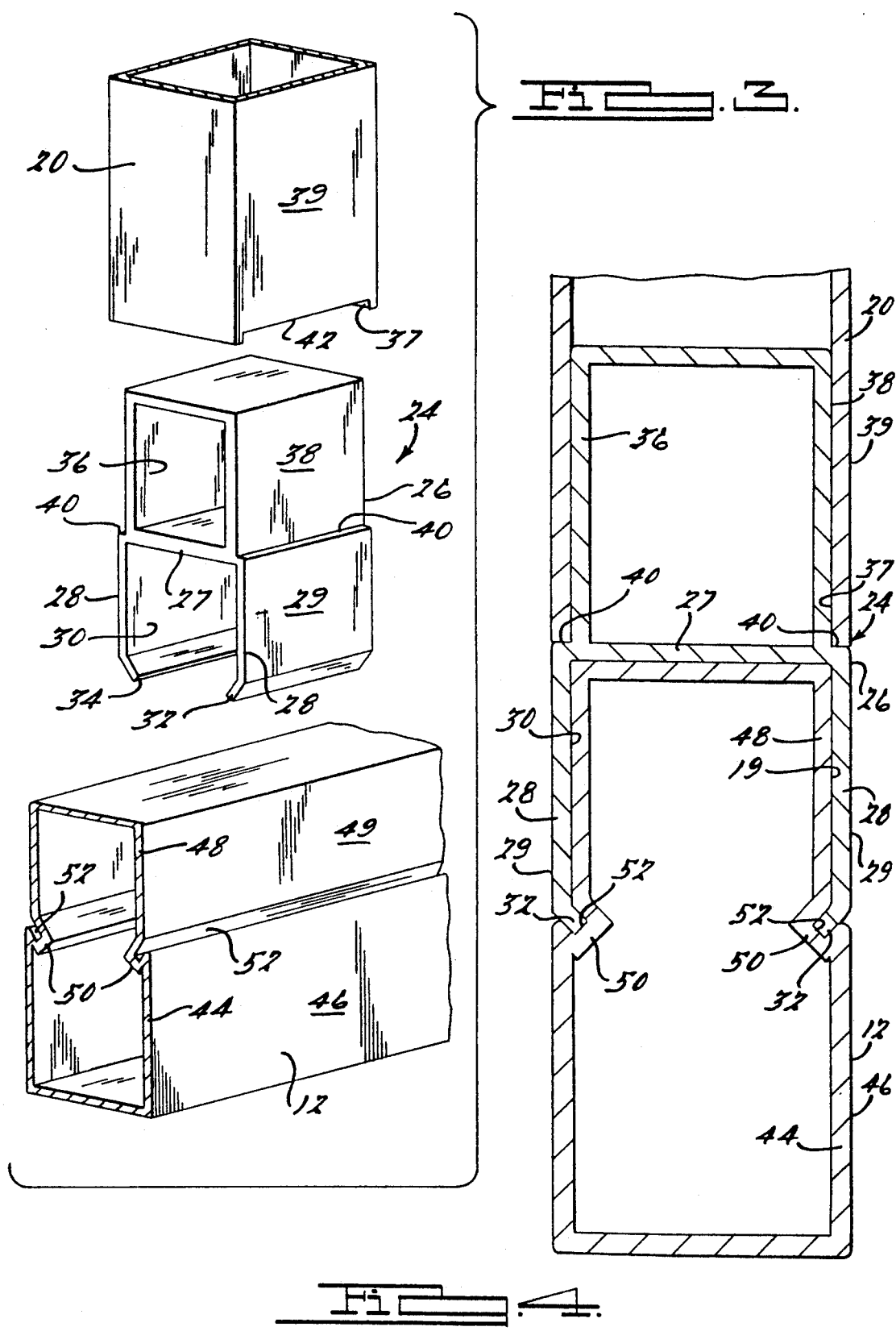

SPACE FRAME JOINT CONSTRUCTION

BACKGROUND OF THE INVENTION

1. Field Of the Invention

The present invention relates generally to frame structures for automotive vehicles and, more specifically, to a joint used in the construction of such frames from lightweight materials.

2. Description Of the Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frame."

It is known to fabricate such space frames from a number of tubular members that are joined by fixed connectors to define the general shape of the vehicle. While this approach provides a distinct advantage in weight and in the tooling cost of manufacturing over the conventional fabrication of unibody construction through massive stampings, it suffers from the disadvantage that the connectors utilized for joining the tubular members together tend to be massive and expensive to fabricate and assemble. Also, these connectors suffer from the disadvantage that they do not provide a flush surface for mounting the outer decorative panels to the space frame.

SUMMARY OF THE INVENTION

Accordingly, the present invention is a space frame for an automotive vehicle including a plurality of structural members having outer surfaces. The space frame also includes joint means axially spacing the structural members for joining the structural members together such that the outer surfaces of the structural members are substantially flush with each other.

One advantage of the present invention is that a space frame for an automotive vehicle is provided. Another advantage of the present invention is that a joint construction for a space frame is provided with a flush surface for mounting the outer decorative panels to the space frame. Yet another advantage of the present invention is that an aluminum joint construction is provided which is lightweight and lower in cost to fabricate and assemble. A further advantage of the present invention is that the joint construction provides for locating and securing structural members together.

Other objects, features and advantages of the present invention will be readily appreciated as the same becomes better understood after reading the following description taken in light of the accompanying drawings.

BRIEF DESCRIPTION OF THE DRAWINGS

FIG. 3 is an exploded perspective view of the joint construction of FIG. 2.

FIG. 4 is a sectional view taken along line 4—4 of FIG. 2.

DESCRIPTION OF THE PREFERRED EMBODIMENT(S)

Figure 1:
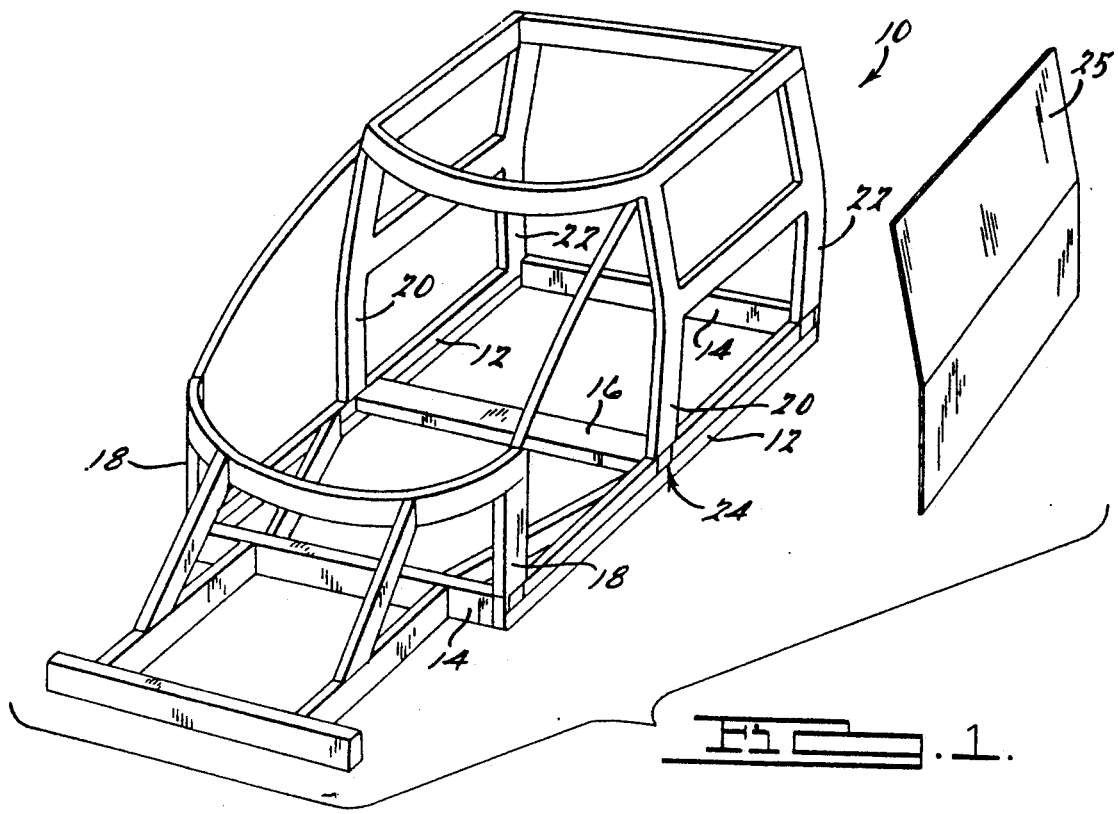
FIG. 1 is a perspective view of a space frame according to the present invention.

Turning now to the drawings and in particular to FIG. 1 thereof, a space frame 10 according to the present invention is illustrated for an automotive vehicle. The space frame 10 includes longitudinally extending side rails 12 and laterally extending end and central cross members 14, 16, respectively, interconnecting the side rails 12. The space frame 10 also includes vertically extending front, center and rear pillar members 18, 20, 22, respectively, attached to the side rails 12 by joint constructions, according to the present invention and generally indicated at 24. The joint constructions 24 provide a substantially flush outer surface between structural members such as the side rails 12 and pillar members 18, 20, 22 for mounting outer decorative panels 25 to the space frame 10. The outer decorative panels 25 are made of a lightweight material such as plastic and mounted to the space frame 10 by suitable means such as an adhesive. It should be appreciated that the joint constructions 24 may be used for joining other structural members of the space frame 10.

The space frame 10 includes other structural members which are not labeled or specifically described to form the space frame 10 illustrated in FIG. 1. The structural members of the space frame 10 are tubular members extruded from a lightweight material such as an aluminum material and having a generally rectangular cross-section. It should be appreciated that other suitable lightweight materials and cross-sectional shapes may be used.

Figure 2:
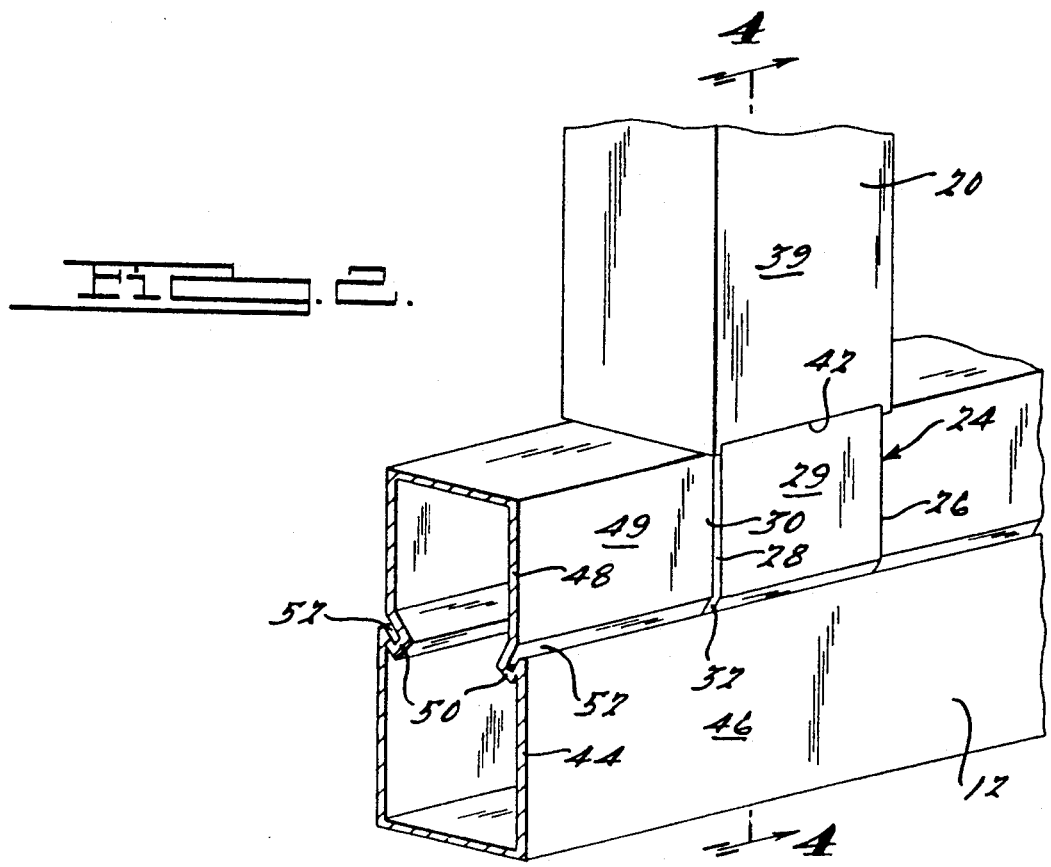
FIG. 2 is a perspective view of a joint construction, according to the present invention, of the space frame of FIG. 1.

Referring to FIGS. 2 through 4, a joint construction 24 is illustrated for joining the center pillar member 20 to the side rail 12. The joint construction 24 includes a connector 26 having a generally rectangular shape. The connector 26 has a base wall 27 interconnecting a pair of side walls 28 with an outer surface 29. The side walls 28 ar spaced laterally and substantially parallel to each other and cooperate with the base wall 27 to form a channel 30 extending longitudinally therethrough and adapted to receive the side rail 12. The connector 26 also has a pair of opposed tongues or tabs 32 at the ends of the side walls 28 for a function to be described. The tabs 32 extend outwardly and inwardly across the channel 30 to form an open end 34 having a width less than a width of the channel 30.

The connector 26 also has an inverted generally U-shaped extension 36 connected to the base wall 27 and adapted to be disposed through an open end 37 of the center pillar member 20. The extension 36 has an outer surface 38 on opposed sides which is offset inwardly or transversely a predetermined amount relative to the outer surface 29 of the side walls 28. Preferably, the predetermined amount is equal to the wall thickness of the center pillar member 20 such that an outer surface 39 of the center pillar member 20 is substantially flush with the outer surface 29 of the side walls 28. The connector 26 also has a shoulder 40 formed by the offset between the outer surface 38 and the outer surface 29. The center pillar member 20 has a generally rectangular shaped recess 42 on opposed sides with a width sufficient to receive the width of the side walls 28. The edges of the recess 42 abut the shoulder 40 and partially overlap the side walls 28 to prevent longitudinal movement between the center pillar member 20 and the connector 26.

Preferably, the extension 36 and side walls 28 of the connector 26 are integral and formed as one-piece. The connector 26 is formed as an extrusion from a lightweight material such as an aluminum material.

The side rail 12 has a generally rectangular shape with a lower portion 44 having an outer surface 46 and a generally U-shaped cross section. The side rail 12 also has an upper portion 48 having an outer surface 49 and a generally inverted U-shaped cross section. The upper portion 48 has a width less than a width of the lower portion 44 such that the outer surface 49 is offset inwardly o transversely a predetermined amount relative to the outer surface 46. Preferably, the predetermined amount is equal to the thickness of the side walls 28 of the connector 26 such that the outer surface 29 of the side walls 28 are substantially flush with the outer surface 46 of the lower portion 44. The upper portion 48 and lower portion 44 are connected by a generally U-shaped connection portion 50 which forms a groove 52 extending inwardly and downwardly relative to the outer surface 46 for a function to be described. It should be appreciated that the lower portion 46, upper portion 48 and connector portion 50 are integral.

In operation, the center pillar member 20 is fixedly secured to the side rail 12 by the joint construction 24. Typically, the extension 36 of the connector 26 is disposed within the open end 37 of the center pillar member 20 such that the side walls 28 are received in the recesses 42 of the center pillar member 20. It should be appreciated that an adhesive may be disposed between the extension 36 and the center pillar member 20 to secure the connector 26 to the center pillar member 20.

Next, an adhesive such as a structural adhesive may be disposed on the interior surfaces of the side walls 28 of the connector 26 which is then disposed over the upper portion 48 of the side rail 12. Preferably, the structural adhesive is an acrylic adhesive. An example of such an acrylic adhesive is found under the trade name Versilok acrylic adhesive (AD5830) of the Lord Corporation. It should be appreciated that other suitable adhesives may be used.

The connector 26 is moved toward the side rail 12 such that the tabs 32 engage the upper portion 48 and flex. The connector 26 is moved toward the side rail 12 such that the upper portion 48 extends through the open end 34 and is received in the channel 30 of the connector 26. When the tabs 32 are adjacent the grooves 52, the side walls 32 return to their original position to dispose the tabs 32 in the grooves 52. It should also be appreciated that the adhesive may be disposed in the grooves 52 to secure the tabs 32 in the grooves 52.

Accordingly, the tabs 32 provide for locating and securing the structural members together and permits a snap-fit engagement therebetween. Also, the base wall 27 of the connector 26 spaces axially the side rail 12 and center pillar member 20. Further, the outer surfaces 39, 29, 46 of the pillar member, connector and side rail 20, 26, 12, respectively, are substantially flush for mounting exterior or outer decorative panels 12 and seals (not shown) to the space frame 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A space frame for an automotive vehicle, comprising:

a plurality of structural members having outer surfaces; and joint means axially spacing said structural members for joining said structural members together such that said outer surfaces of said structural members are flush with each other, said joint means comprising a connector having a generally rectangular shaped channel adapted to receive one of said structural members and a generally rectangular shaped extension adapted to be disposed into another of said structural members, said connector having a first outer surface and said extension having a second outer surface offset inwardly a predetermined amount relative to said first outer surface, said connector including engagement means engaging one of said structural members for flexing outwardly and returning to its original position to snap-fit onto the one of said structural member such that said outer surfaces of said structural members are flush with said first outer surface.

2. A space frame as set forth in calm 1 wherein said joint means further comprises means forming a pair of grooves on opposed sides of the one of said structural members, and said engagement means comprises a pair of opposed tabs on opposed sides of said connector adjacent said channel, said tabs adapted to be disposed in said grooves.

3. A space frame as set forth in claim 2 wherein said joint means includes an adhesive disposed between said grooves and said tabs.

4. A space frame as set forth in claim 1 wherein said joint means includes an adhesive disposed between said connector and at least one of said structural members and between said extension and at least one of said structural members.

5. A space frame as set forth in claim 1 wherein said structural members are made of an aluminum material.

6. A space frame as set forth in claim 1 wherein said joint means is made of an aluminum material.

7. A space frame as set forth in claim 1 wherein said structural members comprise at least one longitudinally extending structural member and at least one vertically extending structural member.

8. A space frame as set forth in claim 7 wherein said vertically extending structural member comprises a first extrusion having a first outer surface and a generally rectangular shape and said longitudinally extending structural member comprises a second extrusion having a second outer surface and a generally rectangular shape.

9. A space frame as set forth in claim 8 wherein said channel receives said longitudinally extending structural member and said extension is disposed into said vertically extending structural member.

10. A space frame as set forth in claim 9 wherein said connector has a third outer surface and said extension is offset inwardly such that said first outer surface is substantially flush with said third outer surface and said longitudinally extending structural member has a portion offset inwardly such that said third outer surface is substantially flush with said second outer surface.

11. A space frame for an automotive vehicle, comprising:
    at least one longitudinally extending structural member;
    at least one vertically extending structural member; and
    joint means for joining said longitudinally and vertically extending structural members together such that outer surfaces of said longitudinally and vertically extending structural members are flush with each other, said vertically extending structural member comprising a first extrusion having a first outer surface and a generally rectangular shaped first open end, said longitudinally extending structural member comprising a second extrusion having a second outer surface and a generally rectangular shape, said joint means comprising a connector including means forming a generally rectangular shaped channel adapted to receive said second extrusion and a generally rectangular shaped extension adapted to be disposed through said first open end of said first extrusion, said joint means including means forming a pair of grooves on opposed sides of said second extrusion and engagement means engaging said second extrusion for flexing said channel forming means outwardly and returning to its original position to snap-fit into said grooves, said connector having a third outer surface and said extension being offset inwardly such that said first outer surface is flush with said third outer surface and said second extrusion having a portion offset inwardly such that said third outer surface is flush with said second outer surface.

12. A space frame as set forth in claim 11 wherein said engagement means comprises a pair of opposed tabs on opposed sides of said connector adjacent said channel.

13. A space frame ass et forth in claim 11 wherein said joint means includes an adhesive disposed between said connector and said second extrusion and between said extension and said first extrusion.

14. A space frame for an automotive vehicle, comprising:
    at least one longitudinally extending first extrusion;
    at least one vertically extending second extrusion;
    a connector having a pair of spaced side walls forming a generally rectangular shaped channel adapted to receive said first extrusion and a generally rectangular shaped extension adapted to be disposed through an open end of said second extrusion for joining said first and second extrusions together such that outer surfaces of said first and second extrusions are flush with each other;
    said first extrusion including means forming a pair of grooves on opposed sides thereof;
    said side walls having a tab at each end thereof extending across said channel to form an open end having a width less than a width of said channel, said tab engaging said first extrusion to flex said side wall outwardly and to return to its original position when disposed in said groove;
    said side walls having an outer surface and said extension being offset inwardly such that an outer surface of said second extrusion is flush with said outer surface of said side walls and said first extrusion has a portion offset inwardly such that said outer surface of said side walls is flush with an outer surface of said first extrusion.

15. A space frame for an automotive vehicle, comprising:
    at least one longitudinally extending first extrusion;
    at least one vertically extending second extrusion;
    an extruded connector having a base wall interconnecting a pair of spaced side walls forming a generally rectangular shaped and longitudinally extending channel adapted to receive said first extrusion and an inverted generally U-shaped extension connected to said base wall and to form an aperture extending longitudinally therethrough, said extension being adapted to be disposed through an open end of said second extrusion for joining said first and second extrusions together such that outer surfaces of said first and second extrusions are flush with each other;
    said first extrusion including means forming a pair of inclined grooves on opposed sides thereof;
    said side walls having an inclined tab at each end thereof to form an open end having a width less than a width of said channel, said tab engaging said first extrusion to flex said side wall outwardly and to return to its original position when disposed in said groove;
    said side walls having an outer surface and said extension being offset inwardly such that an outer surface of said second extrusion is flush with said outer surface of said side walls and said first extrusion has a portion offset inwardly such that said outer surface of said side walls is flush with an outer surface of said first extrusion.

* * * * *